Figure 1:
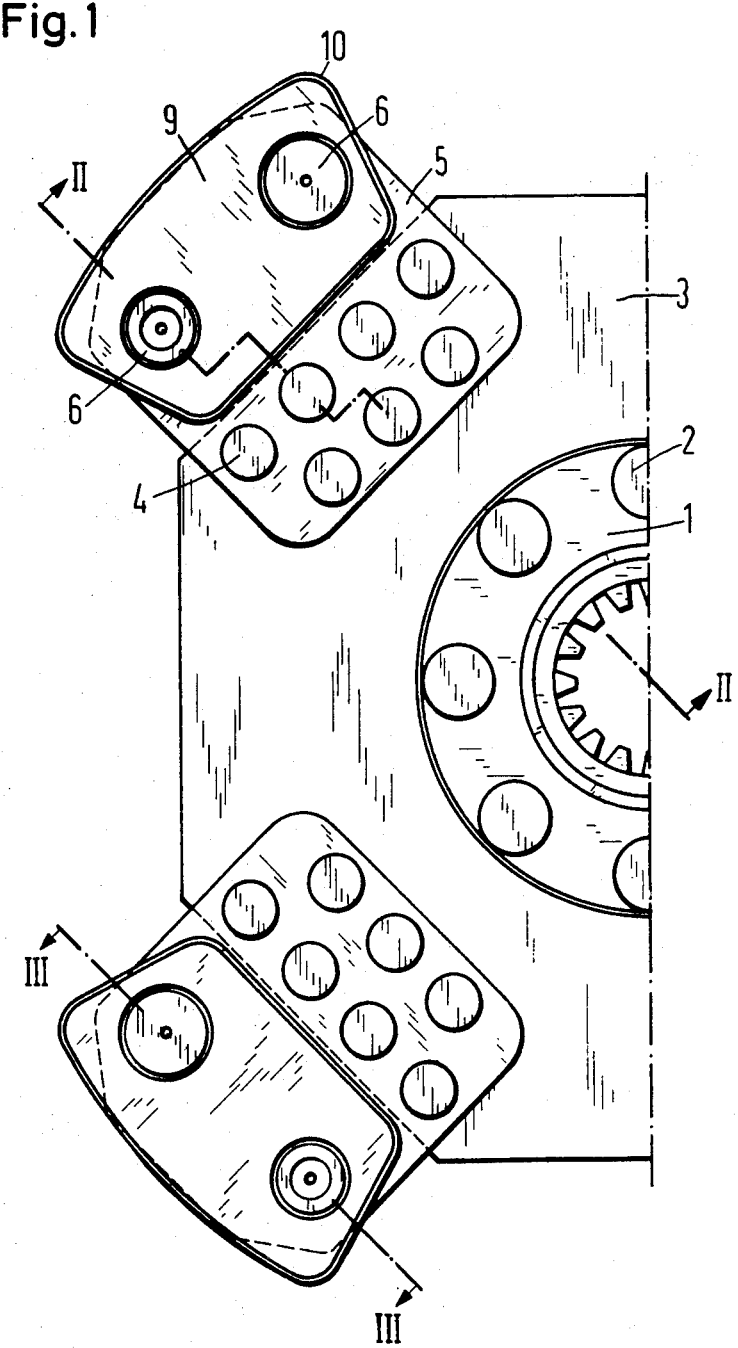

United States Patent
Dantele

[15] 3,696,902
[45] Oct. 10, 1972

[54] CLUTCH DISC WITH METALLIC FRICTION FACINGS

[72] Inventor: Johann Dantele, Schwebheim, Germany

[73] Assignee: Fichtel & Sachs AG, Schweinfurt am Main, Germany

[22] Filed: July 14, 1971

[21] Appl. No.: 162,519

[30] Foreign Application Priority Data

July 24, 1970 Germany..........P 20 36 761.7

[52] U.S. Cl. ...............................................192/107 C
[51] Int. Cl...............................................F16d 13/69
[58] Field of Search...........192/107 C, 107 R, 107 M

[56] References Cited

UNITED STATES PATENTS

| | | | |
|---|---|---|---|
| 1,652,007 | 12/1927 | Gamble | 192/107 C |
| 3,064,782 | 11/1962 | Bois | 192/107 C |
| 3,261,439 | 7/1966 | Binder | 192/107 C |

*Primary Examiner*—Benjamin W. Wyche
*Attorney*—Kelman and Berman

[57] ABSTRACT

The opposite friction facings of solid metal or sintered powder metal on the driven disc of a friction clutch are mounted on respective, normally convex faces of pairs of carriers which are symmetrical relative to a radial plane and are prevented from bulging apart by rivets which also fasten the facings to the carriers. The convex faces are directed in opposite axial directions, and the rivets pass through them along lines which are farthest from corresponding lines on the other carrier of the pair.

9 Claims, 5 Drawing Figures

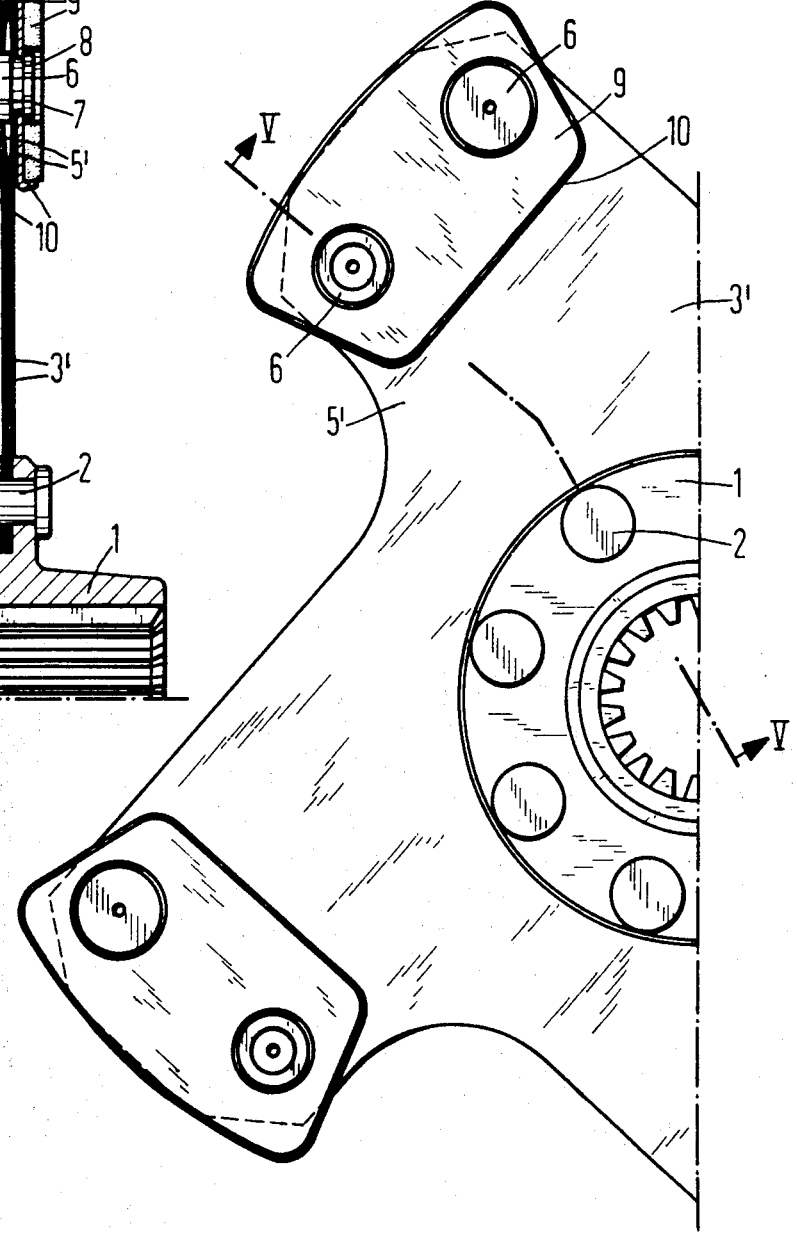

CLUTCH DISC WITH METALLIC FRICTION FACINGS

This invention relates to driven discs for friction clutches, and particularly to a friction disc assembly for a friction clutch which employs friction facings essentially consisting of solid metal or of sintered powder metal.

It is known to mount such facings on resilient carriers in such a manner that the members of each pair of facings are directed in opposite axial directions. The known arrangement makes it necessary that the friction facings be obliquely inclined relative to a plane radial with respect to the clutch axis. When the friction facings consist of hard metal, particularly sintered powder metal, their exposed edges tend to break down. The area of contact between the known facings and cooperating surfaces of driving clutch elements is small, and the relatively high contact pressure concentrated on a small area frequently causes shrieking noises which are characteristic of the known metallic friction facings.

It is the primary object of this invention to improve the cooperation of metallic friction facings on a driven disc with the contact faces of driving elements, and particularly to extend the useful life of the facings and to avoid noise from the clutch.

With these and other objects in view, as will hereinafter become apparent, the invention provides a disc assembly in which several pairs of facing carriers of resilient sheet material project radially outward from an annular disc body in circumferentially offset relationship. The carriers of each pair are axially offset and substantially symmetrical relative to a plane transverse to the axis of the disc body. Each carrier of the pair has a face directed axially away from the plane of symmetry and convexly arcuate in all axial sections. The points on each face which, in these axial sections, are farthest from the axially aligned points on the face of the other carrier jointly define a line on the corresponding face. This line is remote from the clutch axis or the axis of the disc body. Each of the substantially entirely metallic disc facings is received in a shallow socket associated with each convex face of the carriers which is open in a direction away from the associated face. Rivets which are spaced circumferentially pass through the convex faces of the carriers substantially in the afore-mentioned lines. Each rivet has several enlarged portions which limit movement of the convex faces of the paired carriers away from each other and secure a friction facing and the socket receiving the last-mentioned friction facing to the associated carrier.

Figure 2:
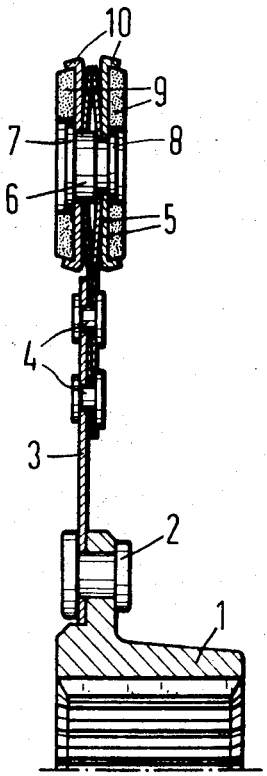
Figure 3:
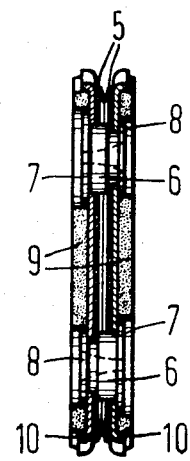

Other features, additional objects, and many of the attendant advantages of this invention will readily become apparent as the invention becomes better understood by reference to the following detailed description of preferred embodiments when considered in connection with the appended drawings in which:

FIG. 1 shows one half of a driven disc of the invention in front elevation;

FIGS. 2 and 3 respectively illustrate the device of FIG. 1 in section on the lines II—II and III—III;

FIG. 4 shows a modified driven disc in a view corresponding to that of FIG. 1; and FIG. 5 is a section of the apparatus of FIG. 4 taken on the line V—V.

Referring initially to FIG. 1 there is shown a driven disc of a friction clutch which is normally secured on the driven clutch shaft by means of an internally splined hub 1. Rivets 2 fasten the octagonal disc body 3 to the hub 1, and rivets 4 fasten the outer circumference of the annular disc body 3 to four equiangularly distributed pairs of friction facing carriers 5 which are made of spring-temper sheet metal.

As is better seen from FIGS. 2 and 3, the portions of the carriers 5 attached to the disc body 3 are flat, and the portions which project radially beyond the outer edge of the disc body 3 are approximately cylindrically arcuate and symmetrical relative to a plane perpendicular to the clutch axis, the convex faces of the arcuate carrier portions being directed away from the plane of symmetry.

The two carriers 5 of each pair are connected by two shoulder rivets 6. The rivets pass through the carriers 5 in respective lines, such as that represented by the section line III—III in FIG. 1, which connect those points on the convex faces which are farthest from respective axially aligned points on the convex face of the other carrier in axial sections through the carrier faces, such as the section of FIG. 2. In other words, the rivets are located where the carriers 5 bulge farthest apart, and the enlarged heads 7, 8 of each rivet 6 limit movement of the convex faces away from each other. The aforementioned lines are remote from the clutch axis.

The rivets 6 also secure a friction facing 9 and a shallow socket 10 to each associated carrier 5. The socket 10 is open in a direction away from the associated carrier 5, and the friction facing 9, which consists of sintered powder metal in the illustrated disc assembly, is partly received in the socket 10. The friction facings are plates having each the approximate shape of a trapezium whose greater base and corners are rounded. The friction facings 9 are held in the sockets 10 by the inturned edges of the latter, and two openings in each facing 9 accommodate the larger head 7 of one rivet 6 and the smaller head 8 of the other rivet 6.

An annular groove between the smaller head 8 and the enlarged shoulder portion of each rivet 6 receives respective parts of one socket 10 and of the associated carrier 5 in fixedly fastened relationship. The shoulder portion passes freely through openings in the other carrier 5 and socket 10, and the head 7 on the shoulder portion abuts against the other socket 10 and limits its movement away from the radial plane of symmetry of the carriers under the resilient force of the associated carrier 5. The other socket 10 and the associated carrier are free, however, to move away from the head 7 when engaged by a cooperating clutch member, such as a pressure plate. Each friction facing 9 is thus fixedly fastened to the associated carrier 5 by one of the two shoulder rivets and resiliently movable relative to the other.

As is evident from FIG. 1, the lines which connect the centers of the rivets and extend along the widest bulge of the carriers 5 are straight and perpendicular to a radius through the clutch axis which circumferentially bisects the carriers 5, also the associated sockets 10 and friction facings 9. The portions of the lines represented in FIG. 1 by the section line III—III which are located between the two rivets 6 are nearest the clutch axis.

In the modified disc assembly illustrated in FIGS. 4 and 5, the disc body 3' consists of two layers of spring metal respectively integral with the four carriers 5' which are assembled with sockets 10 and friction facings 9 by rivets 6 in the same manner as described with reference to FIGS. 1 to 3. The disc body portion 3' proper is approximately square, and the four carrier portions 5' project from the sides of the square near the corners in such a manner that reference lines drawn through the centers of the two rivets 6 associated with each pair of carrier portions 5' are nearest the clutch axis where they project beyond one rivet 6 away from the associated other rivet. Each line is parallel to the side of the square body portion 3' from which the carrier portion 5' projects.

The drawing illustrates the disc assemblies in the released condition of the clutch, not otherwise shown. The carriers 5 are under limited compressive stress due to the confining action of the rivets 6. When the disc assembly is compressed between two driving clutch elements, each rivet 6 moves with one friction facing while movably guiding the other facing. Because of the symmetrical arrangement of the resilient carriers 5, 5', the two friction facings 9 associated with each pair of carriers are moved toward each other during clutch engagement while their exposed faces remain perfectly parallel for area contact with the driving clutch elements. Ultimately, the carriers 5 are flattened in abutting engagement with each other. Contact is never limited to a part of the exposed friction facing, and the probability of failure in the brittle powder metal is small. The clutch operates quietly, smoothly, and reliably.

Both illustrated embodiments operate in the same manner, and the choice between them will be determined by specific conditions and by considerations of manufacturing economics. The friction facings, when arranged as shown in FIG. 4, sweep a larger surface of the driving clutch elements and thus cause less wear to the latter. Although the rivets 4 are are not required in the modified disc assembly of FIGS. 4, 5, the assembly illustrated in FIG. 1 is normally built at lower cost. Obviously, the location and orientation of the friction facings shown in FIG. 1 may be achieved with carriers integral with the disc body, and the arrangement of the friction facings seen in FIG. 4 is equally available with a built-up disc body 3 of the type seen in FIG. 1. The choice of an integral or a rivetted connection between the disc body and the carriers for the friction facings may also be influenced by considerations of heat transfer.

The arrangement of FIGS. 1 to 3 will be preferred where the overall diameter of the clutch is limited, yet the median distance of the friction facings from the clutch axis is to be made as great as possible.

The axial movement of the friction facings 9 between the disengaged position illustrated and that assumed in the fully engaged clutch is relatively long, and this long movement against the resilient restraint of the carriers 5, 5' is thought to be an important factor in the smooth and noiseless engagement of a clutch equipped with the friction disc assembly of the invention.

It should be understood, of course, that the foregoing disclosure relates only to preferred embodiments of the invention, and that it is intended to cover all variations and modifications of the examples of the invention chosen herein for the purpose of the disclosure which do not depart from the spirit and scope of the invention set forth in the appended claims.

What is claimed is:

1. A friction disc assembly for a friction clutch comprising, in combination:
  a. an annular disc body having an axis;
  b. a plurality of pairs of facing carriers of resilient material projecting radially outward from said disc body in circumferentially offset relationship,
     1. the carriers of each pair being axially offset and substantially symmetrical relative to a plane transverse to said axis,
     2. each carrier of said pair having a face directed axially away from said plane and convexly arcuate in all axial sections,
     3. the points on each face farthest in said sections from the axially aligned points on the face of the other carrier jointly defining a line on the corresponding face, said line being remote from said axis;
     4. a socket member associated with each face and open in a direction away from the associated face;
  c. a substantially metallic friction facing member partly received in each socket member; and
  d. a plurality of circumferentially spaced rivets passing through said faces substantially in said lines, each rivet including a plurality of enlarged portions, said portions limiting movement of said faces away from each other and securing a friction facing member and the socket member receiving the last-mentioned friction facing member to the associated carrier.

2. An assembly as set forth in claim 1, wherein said lines are approximately straight, each line being perpendicular to a radius drawn on said axis and circumferentially bisecting the corresponding carrier.

3. An assembly as set forth in claim 1, wherein two of said enlarged portions of one of said rivets bound an annular groove in said rivet, respective portions of one carrier and of the socket member associated with the face of said one carrier being received in said groove, a third enlarged portion of said one rivet abuttingly engaging the socket member associated with the face of the other carrier and securing the engaged socket against movement away from said one carrier under the resilient pressure of said other carrier.

4. An assembly as set forth in claim 3, another one of said rivets having two enlarged portions bounding an annular groove in said other rivet, respective portions of said other carrier and of the socket member associated therewith being received in the last-mentioned groove.

5. An assembly as set forth in claim 1, said friction facing members being plates having each the approximate shape of a trapezium.

6. An assembly as set forth in claim 1, wherein a portion of said line between two of said rivets is closest to said axis.

7. An assembly as set forth in claim 1, wherein said line connects two of said rivets and projects beyond one of said rivets, the projecting portion of said line being closest to said axis.

8. An assembly as set forth in claim 1, wherein respective unitary portions of said carriers constitute said disc body.

9. An assembly as set forth in claim 1, wherein said friction facing member essentially consists of sintered metal powder.

* * * * *